United States Patent [19]

Keller et al.

[11] Patent Number: 4,721,027
[45] Date of Patent: Jan. 26, 1988

[54] DOUBLE ACTING LINEAR ACTUATOR

[75] Inventors: William F. Keller, West Covina; Richard D. Sibley, Anaheim, both of Calif.

[73] Assignee: Koso International, Inc., Sante Fe Springs, Calif.

[21] Appl. No.: 321,444

[22] Filed: Nov. 16, 1981

[51] Int. Cl.⁴ ............................................. F15B 15/17
[52] U.S. Cl. .................................... 91/387; 91/417 R; 91/444; 91/461
[58] Field of Search ........... 91/417 R, 387, 51, 417 A, 91/444, 461; 137/625.61, 625.62, 625.64

[56] References Cited

U.S. PATENT DOCUMENTS

| | | | |
|---|---|---|---|
| 2,866,476 | 12/1958 | Orloff | 91/417 R X |
| 3,455,209 | 7/1969 | Preston et al. | 91/417 R |
| 3,521,535 | 7/1970 | Oelrich | 91/417 R X |
| 3,675,538 | 7/1972 | Keller et al. | 91/387 |
| 4,117,765 | 10/1978 | Paduch et al. | 91/417 R X |
| 4,173,984 | 11/1979 | Solomon | 91/51 X |

*Primary Examiner*—Robert E. Garrett
*Attorney, Agent, or Firm*—William P. Green

[57] ABSTRACT

An actuator for moving a valve or other controlled part in correspondence with variations in an input signal and including a piston movable in opposite directions within a cylinder and having a smaller effective area exposed to fluid in a first chamber at one side of the piston than to fluid in a second chamber at the opposite side of the piston, a pressure fluid source delivering pressurized fluid to the first of these chambers and delivering pressurized fluid to the second chamber through a three way valve having a body containing inlet and outlet openings and a valve element movable relative thereto in a manner varying the pressure delivered to the second chamber of the cylinder. A control element downstream of the three way valve is actuable by variations in an input signal to correspondingly vary the discharge of fluid which flows through the specified outlet opening in the three way valve body, and an automatic mechanism responsive to variations in pressure between that outlet opening in the three way valve body and the control element moves the valve element of the three way valve in correspondence with the changes in pressure. A feedback mechanism between the piston and the control element balances the forces actuating that element in a predetermined desired setting of the piston.

27 Claims, 9 Drawing Figures

DOUBLE ACTING LINEAR ACTUATOR

BACKGROUND OF THE INVENTION

This invention relates to improved power operated actuators for moving a valve or other controlled unit in correspondence with variations in an input signal delivered to the mechanism.

An actuator embodying the invention is of a known general type including a piston and cylinder mechanism or equivalent structure utilized in conjunction with a pump or other source of pressurized fluid delivering such fluid under pressure to one side of the piston for power actuating the piston to a desired setting. In prior arrangements of this type it has been proposed that the pressure delivered to the cylinder chamber be varied by discharging the pressure fluid through a nozzle and against a flapper valve element positioned opposite the nozzle and movable relative thereto to controllably vary the rate of fluid flow from the nozzle and thus the pressure applied to the cylinder chamber. A force motor operated by an electrical input signal may actuate this flapper valve, with a feedback spring or other feedback means being connected between the piston and the flapper valve to counterbalance the force exerted by the force motor when the piston has reached a predetermined desired setting. The fluid pressure induced movement of the piston has in prior arrangements been resisted by a spring in a manner resulting in displacement of the piston from a predetermined normal position through a distance dependent upon the pressure applied to the cylinder chamber.

SUMMARY OF THE INVENTION

A purpose of the present invention is to provide an improved actuator similar to that described above but which can be more precisely responsive to input signals, and which operates in a very straightforward manner assuring optimum reliability of operation of the device, while at the same time accomplishing these results with minimum structure. To obtain the improved operational characteristics, a unique three way hydraulic amplifier is employed in conjunction with the other operating parts of the actuator, in a manner achieving a double acting effect on the piston or its equivalent for positively applying fluid pressure to both sides of the piston in a manner actuating the piston to any desired setting corresponding to a particular input signal level, and with the pressures at the opposite sides of the piston being balanced when the desired setting is reached. The hydraulic amplifier assembly includes a three way valve body containing a chamber within which a valve element is mounted for movement relative to an inlet opening through which pressure fluid enters the chamber from a pressure source and an outlet opening through which the pressure fluid discharges toward a control element preferably taking the form of a flapper part opposite a discharge nozzle. A third opening in the valve body supplies pressure fluid to a chamber in the control cylinder with that pressure varying in correspondence with the position of the valve element. A usually higher pressure from the fluid source is delivered to the opposite end of the cylinder but against a face of the piston having a smaller effective area than that exposed to the pressure from the three way valve. Mechanism automatically responsive to variations in pressure between the outlet opening of the three way valve body and the flapper or other control element downstream thereof automatically actuates the valve element in correspondence with such variations in pressure to respond to changes in the setting of the flapper valve in a manner producing a greatly amplified movement of the valve element and correspondingly amplified change in pressure delivered to the variable pressure end of the cylinder. The flapper or other control element may be actuable by a force motor which is energized by an electrical input signal to apply a force to the flapper corresponding to the value of that electrical signal. A counteracting feedback force can be applied from the actuated piston to the control element in a manner maintaining a balance between the forces applied to the flapper when the piston reaches a desired predetermined setting in which the forces applied to its opposite sides by pressure fluid are equal.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figure 1:
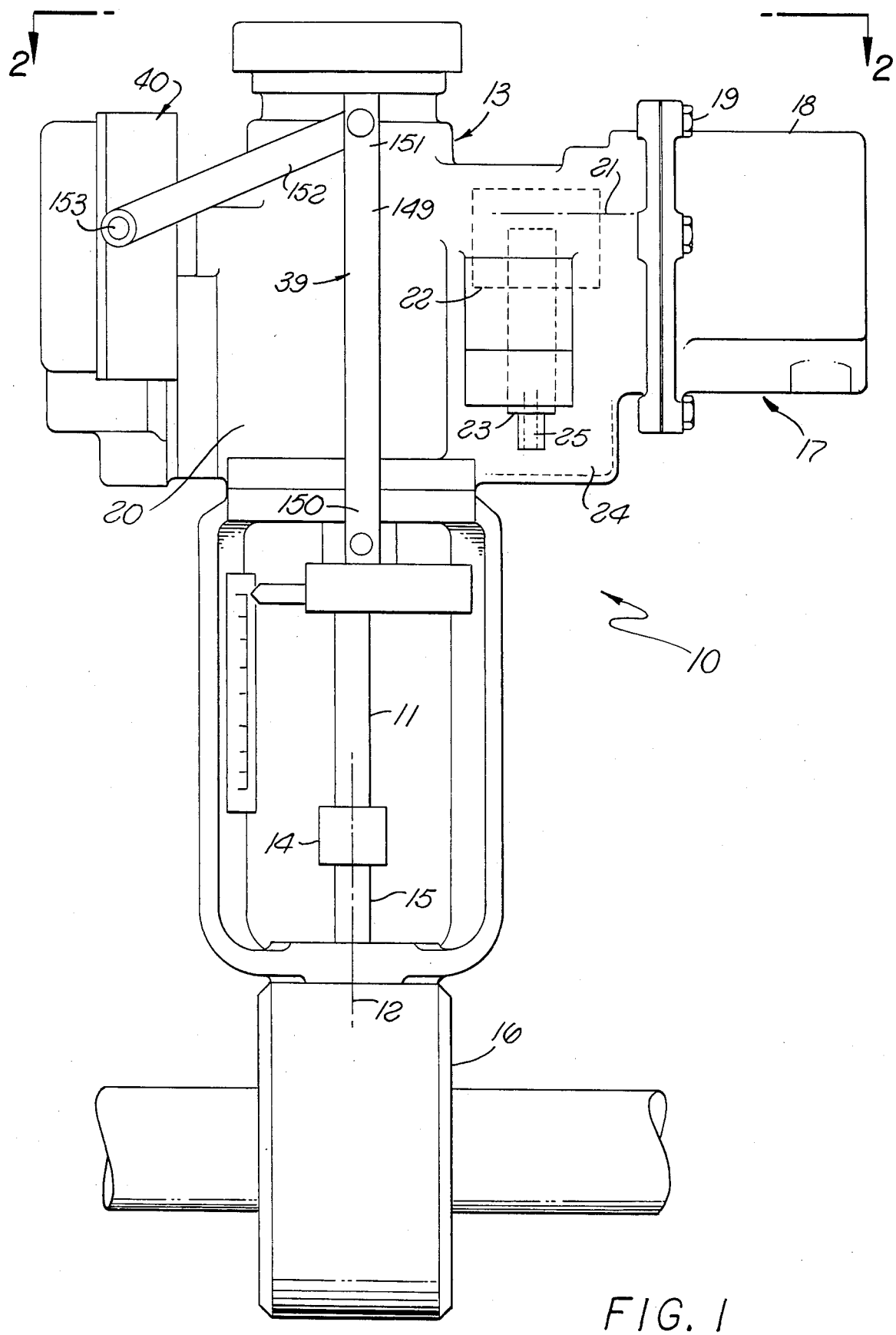
FIG. 1 is a front elevational view of a double acting linear actuator constructed in accordance with the invention.

There is illustrated at 10 in FIG. 1 an electrohydraulic linear actuator which acts to move an output shaft 11 longitudinally along an axis 12 to positions corresponding to the voltage of an electrical input signal. Shaft 11 is the piston rod of a piston and cylinder mechanism 13, and may be connected by a coupling 14 to the stem 15 of a valve or rather controlled unit 16, to power operate stem 15 to different positions representative of or determined by the input signal. Actuator 10 includes an electric motor 17 whose housing 18 is connected by bolts 19 to a main housing part 20 of the actuator, and which motor has a rotary output shaft 21 rotatively driving a positive displacement pump 22 contained within housing 20. Pump 22 preferably is of the reciprocating type, having one or more pistons 23 actuable by shaft 21 to continuously pump hydraulic fluid from a sump 24 in housing 20 upwardly through a suction line 25 and to a pump outlet 26. The pressurized liquid discharged by pump 22 through its outlet 26 is delivered through a number of valves which will be discussed at a later point in this description to two chambers C1 and C2 (FIG. 6) formed in the lower and upper ends respectively of piston and cylinder mechanism 13. That mechanism is illustrated as including a cylinder 27 formed as an insert sleeve contained within a vertical passage 28 formed in the main housing 20 of the device, with the sleeve being sealed externally to that housing by two sets of O-rings 29 and 30 to form an annular fluid passage 31 about the cylinder. Piston 32 is reciprocable upwardly and downwardly along axis 12 relative to the cylinder, and may include a main externally cylindrical body 33 carrying an annular piston head 34 sealed by rings 35 with respect to the cylinder. The upper end of the cylinder is closed by a head 36, and the lower end is closed by an end wall 37 containing an opening 38 through which body 33 of the piston extends downwardly. By virtue of this arrangement, the effective area transversely of axis 12 against which pressurized fluid in chamber C1 exerts upward force against the piston is much smaller than the effective area against which fluid in upper chamber C2 exerts downward force against the piston. The pressure in chamber C1 is maintained at an essentially constant value during operation of the actuator, while the pressure in chamber C2 may vary between different values to actuate the piston either upwardly or downwardly or maintain it in a fixed set position. When the pressure in chamber C2 is at a value at which the total force exerted downwardly on the piston over the entire cross sectional area of the circular top chamber C2 exactly balances the total upward force exerted against the piston by fluid at a higher pressure within annular chamber C1, the piston will be maintained in the position to which it has been set. If the pressure in chamber C2 increases above that value, the piston will move downwardly, and if the pressure in chamber C2 decreases below the discussed value the piston will be moved upwardly. The lower end of the piston body 33 is connected to the previously mentioned piston rod or shaft 11 (FIG. 1), to actuate the valve or other controlled unit 16, and in addition is connected through a feedback linkage 39 (FIG. 1) to apply a force to a controller 40 automatically readjusting the pressure delivered to chamber C2 to exactly balance the upward and downward forces exerted against the piston when the piston reaches a position corresponding to the value of a controlling electrical input signal. Referring to FIG. 7, that signal is delivered to a force motor 41 through electrical conductors 42 from a signal source 43, and preferably is a direct current signal whose potential varies and is to control the extent of actuation of piston 32.

The pressurized hydraulic fluid discharged from pump 22 through its outlet 26 is delivered at a predetermined constant pressure through a line 44 to a pair of valve assemblies 45 and 46 (FIG. 3) which act to automatically shut off the flow of fluid either to or from the main power cylinder 27 when the pump stops to thus maintain the piston in any position to which it has been set. Describing first of all the valving assembly 45, that assembly may include a generally tubular valve body 47 contained within a cylindrical recess 48 in the main housing part 20 and clamped downwardly against a shoulder 49 in the housing by a plug 50 threadedly connected to the housing at 51, with fluid tight seals being formed between the various parts by a number of O-rings 52. A valve element 53 is movable upwardly and downwardly along a vertical axis 54 within part 47, and has a lower extremity 55 which is movable into and out of engagement with an upwardly facing tubular valve seat element 56 to control the flow of fluid downwardly therethrough. The pressurized fluid from the pump is delivered through line 44 to an annular space 57 formed between a lower portion 58 of part 47 and an element 59 secured to and movable vertically with valve element 53. A spring 60 yieldingly urges the valve downwardly into engagement with seat 56. The pressurized fluid from space 57 flows leftwardly in FIG. 3 through a passage 61, and then upwardly through a passage 62 and past a variable restriction element 63, which reduces the pressure above that restriction for delivery of the reduced pressure through a passage 64 into an annular space 65 about part 47, from which the reduced pressure fluid flows through openings 66 in the tubular side wall of part 47 into a chamber 67 formed radially between parts 47 and 53 and vertically between parts 59 and 50. The reduced pressure in chamber 67 thus acts downwardly against part 59 and an assembly 68 by which that part is connected to valve element 53, to urge those parts downwardly as a piston while the pressure at their underside urges them upwardly. When the pump is not operating, spring 60 exerts sufficient downward force to effectively close valve element 53 downwardly against seat 56. When the pump is in operation, the pressure in lower chamber 57 is enough greater than the pressure in the upper chamber 67 to overcome both that pressure and the force of spring 60 and thereby urge valve element 53 upwardly to its open position represented in FIG. 3. The assembly thus functions as an automatic shut off valve for closing element 53 against seat 56 when the pump stops operating.

Figure 3:
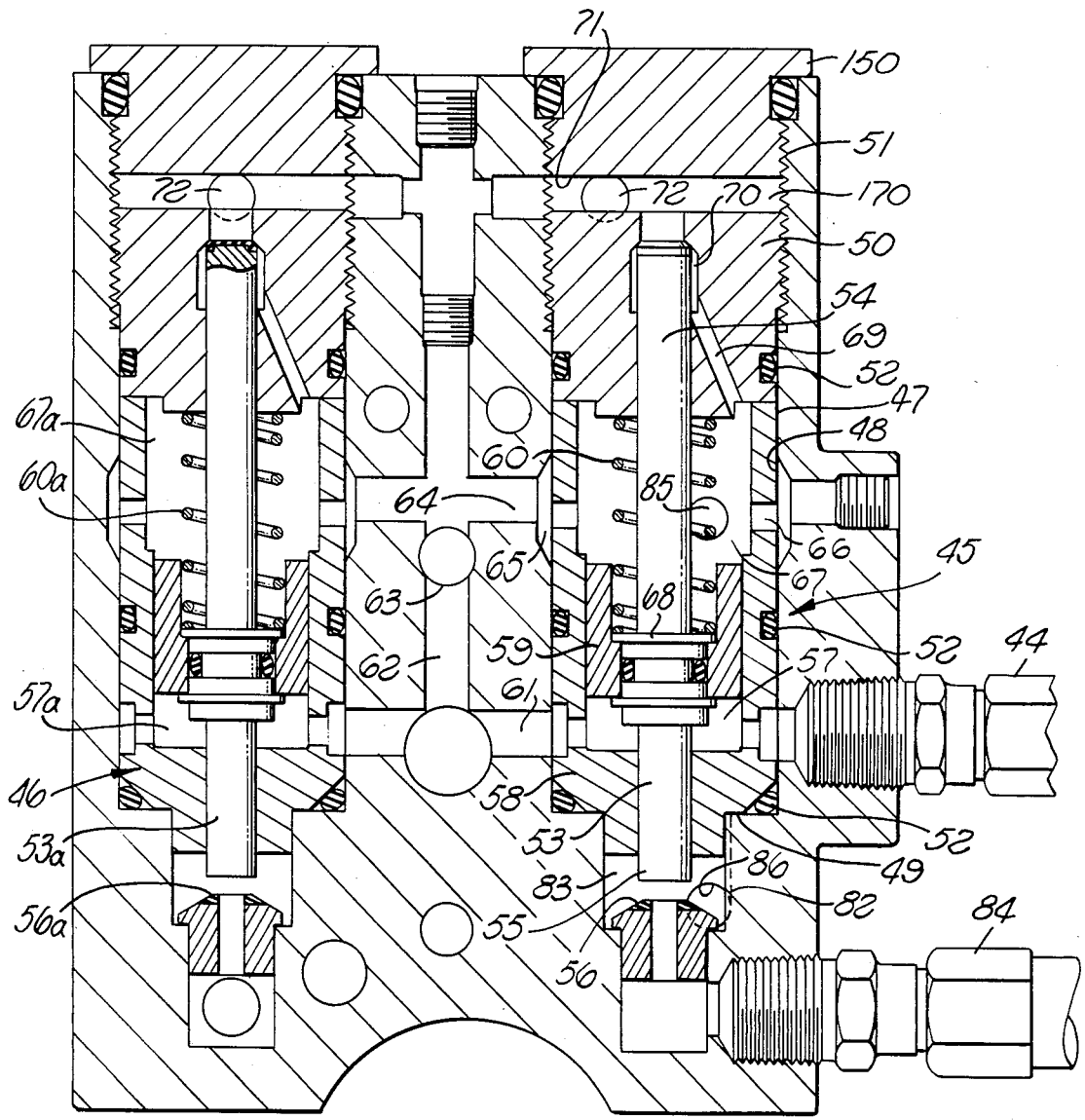
FIG. 3, 4, 5, 6, 7 and 8 are fragmentary vertical sections taken on line 3—3, 4—4, 5—5, 6—6, 7—7 and 8—8 respectively, of FIG. 2.
Figure 2:
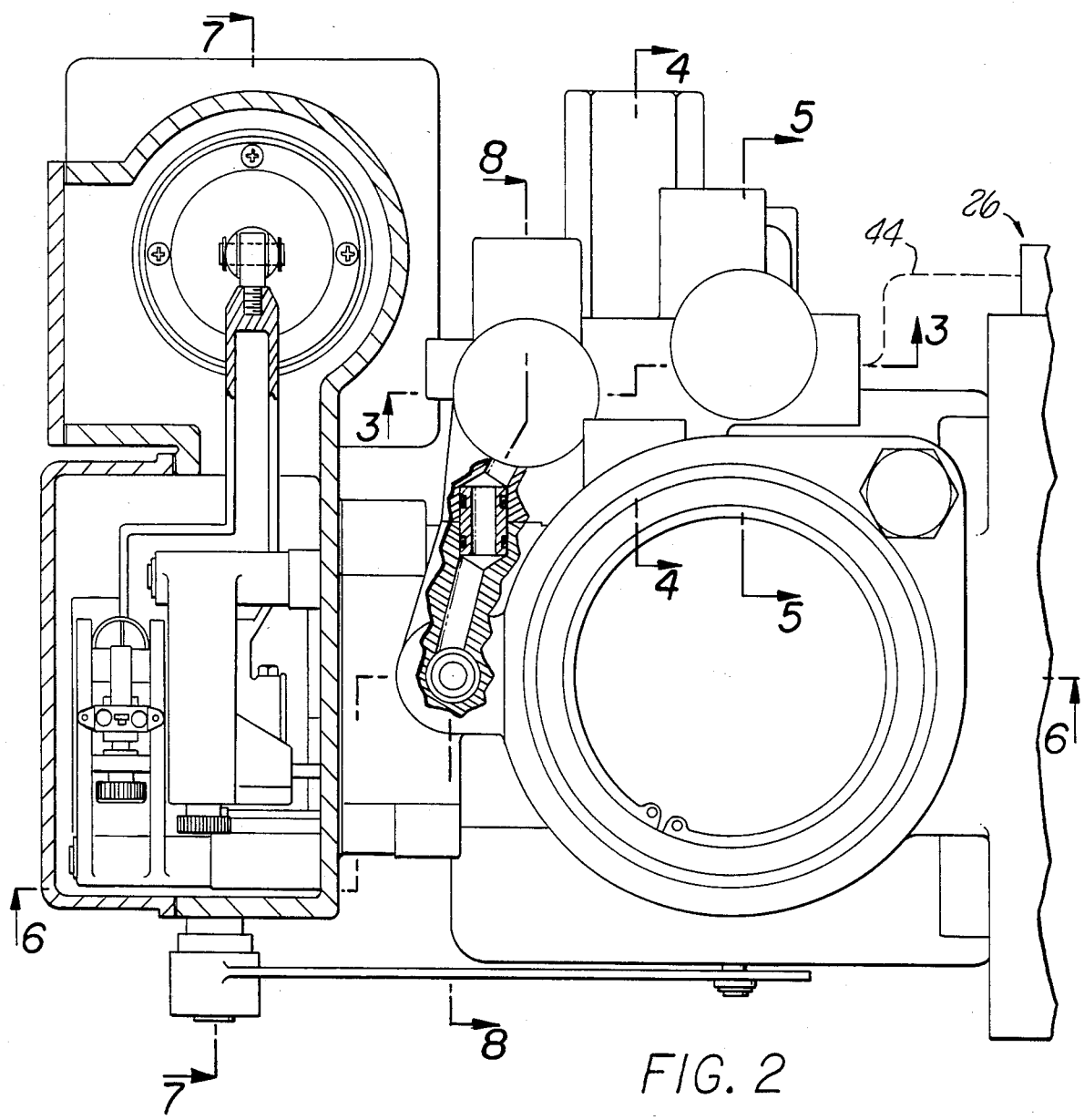
FIG. 2 is an enlarged plan view taken on line 2—2 of FIG. 1.
Figure 4:
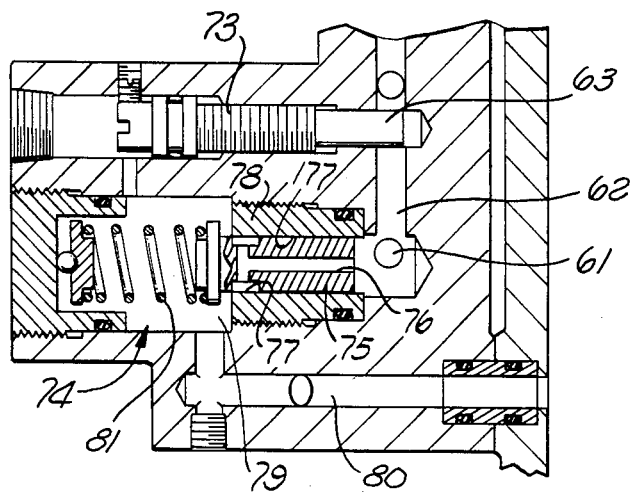
Figure 5:
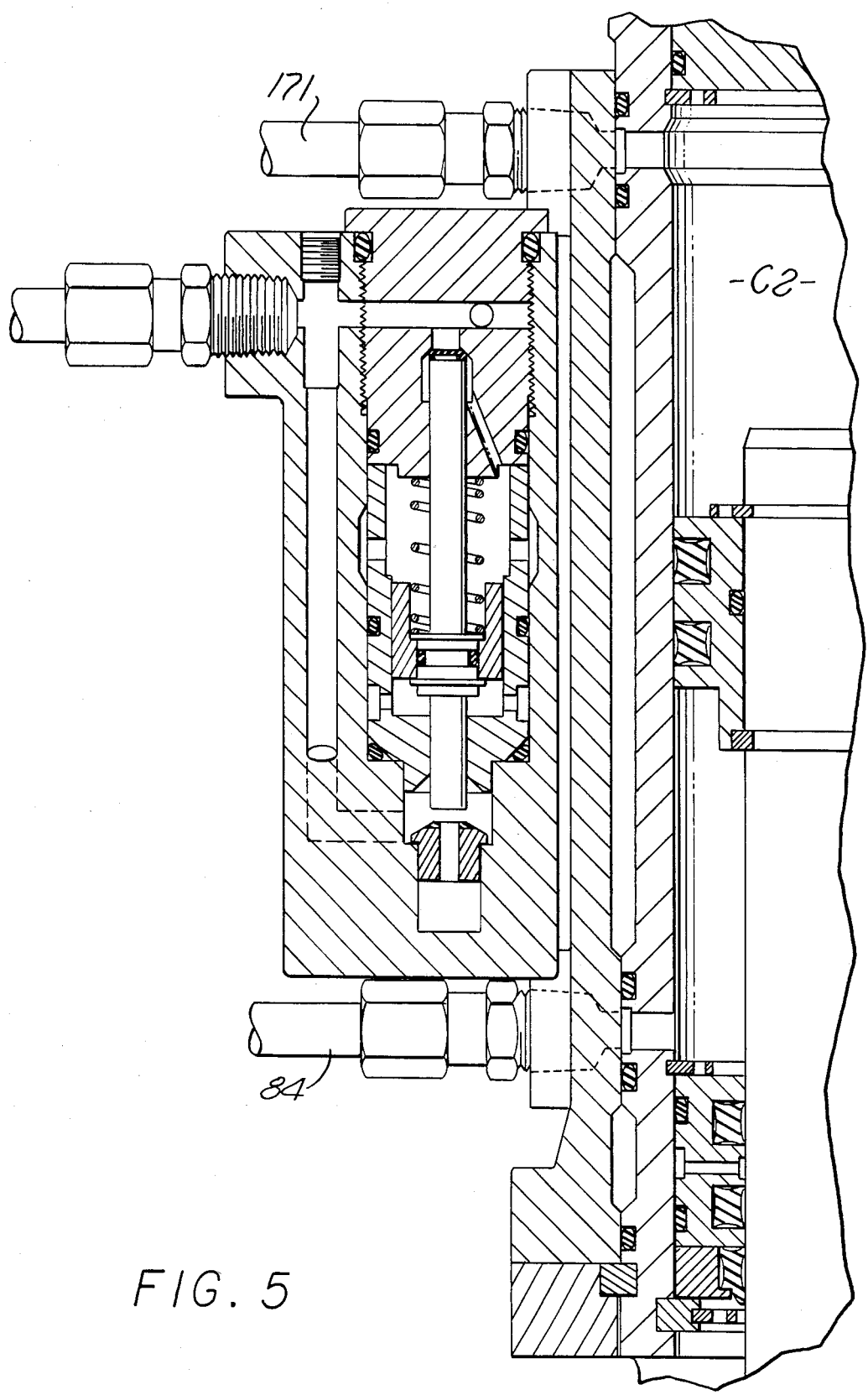

The second valve assembly 46 of FIG. 3 is constructed essentially the same as the above described assembly 45, and has a valve element 53a urged downwardly by a spring 60a and against a seat 56a when there is no pressure in either of the chambers 57a or 67a, but urged upwardly to the FIG. 3 open position against the tendency of the spring by the differential pressure condition which exists when the pump is in operation and there is a lower pressure in chamber 67a than in 57a. The restriction 63 maintains the described differential pressure in both of the valve assemblies 45 and 46 when the pump is in operation. Fluid is allowed to discharge slowly from upper chambers 67 and 67a through bleed passages 69 and spaces 70 about the upper ends of valve elements 53 into spaces 170 between plugs 50 and 150 and then into fluid return passages 71 which communicate through a return line 72 with the reservoir space 24 (FIG. 1) formed in housing 20 beneath pump 22, to thus return the pressurized fluid thereto. As seen best in FIG. 4, the adjustable restriction element 63 may function in a manner similar to a needle valve, and consist of a part extending transversely across passage 62 and threadedly connected to the housing at 73 to controllably vary the amount of restriction offerred to the fluid flow therepast and thus vary the pressure drop between chambers 57 and 67. As also seen in FIG. 4, there may be provided a pressure relief valve assembly 74 including a valve element 75 containing a passage 76 to which the pressure in passage 61 is delivered, and containing also an annular groove 77 normally received within and closed by engagement with a cylindrical inner surface 177 of the valve body part 78 but adapted to communicate with a space 79 leading to a passage 80 through which fluid can discharge back to reservoir 24. A spring 81 normally maintains the valve element 75 in closed condition, but in response to attainment of a predetermined excessive pressure permits valve element 75 to move leftwardly just sufficiently to reduce the pressure to a desired optimum value, thus functioning as an excess pressure relief or regulating valve.

When valve 53 of FIG. 3 is open, the pressure in chamber 67 is communicated through a passage represented at 82 in FIG. 3 to the space 83 above valve seat 56, for flow through that valve seat and through a connected line 84 to lower chamber C1 of the cylinder. As represented in FIG. 3, the passage 82 extends through the material of the main body or housing 20 of the device and communicates at its upper end through an opening 85 with chamber 67 and at its lower end through an opening 86 with chamber 83. Thus, when the pump is in operation, a predetermined pressure is delivered continuously to chamber C1.

Figure 6:
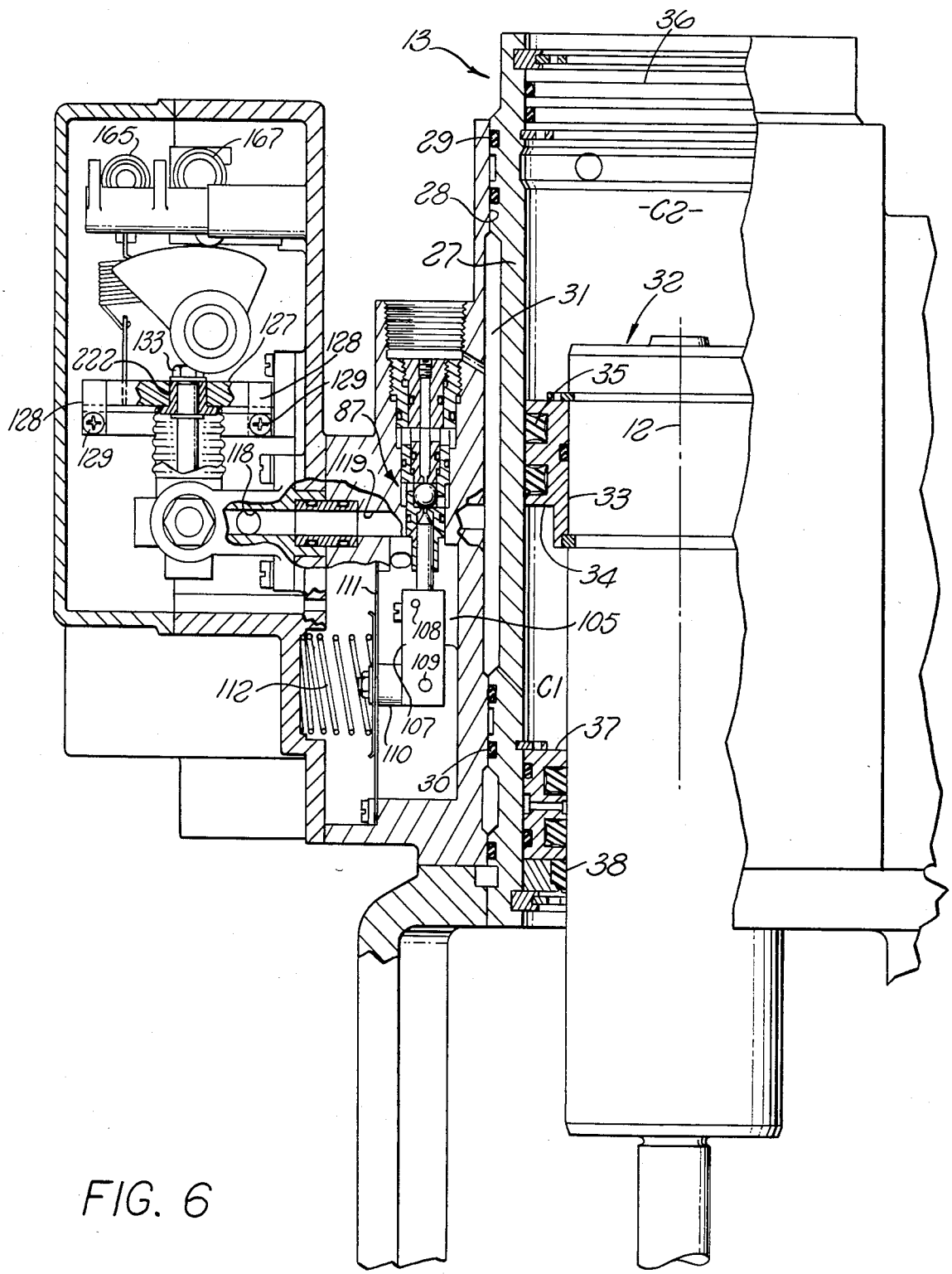
Figure 7:
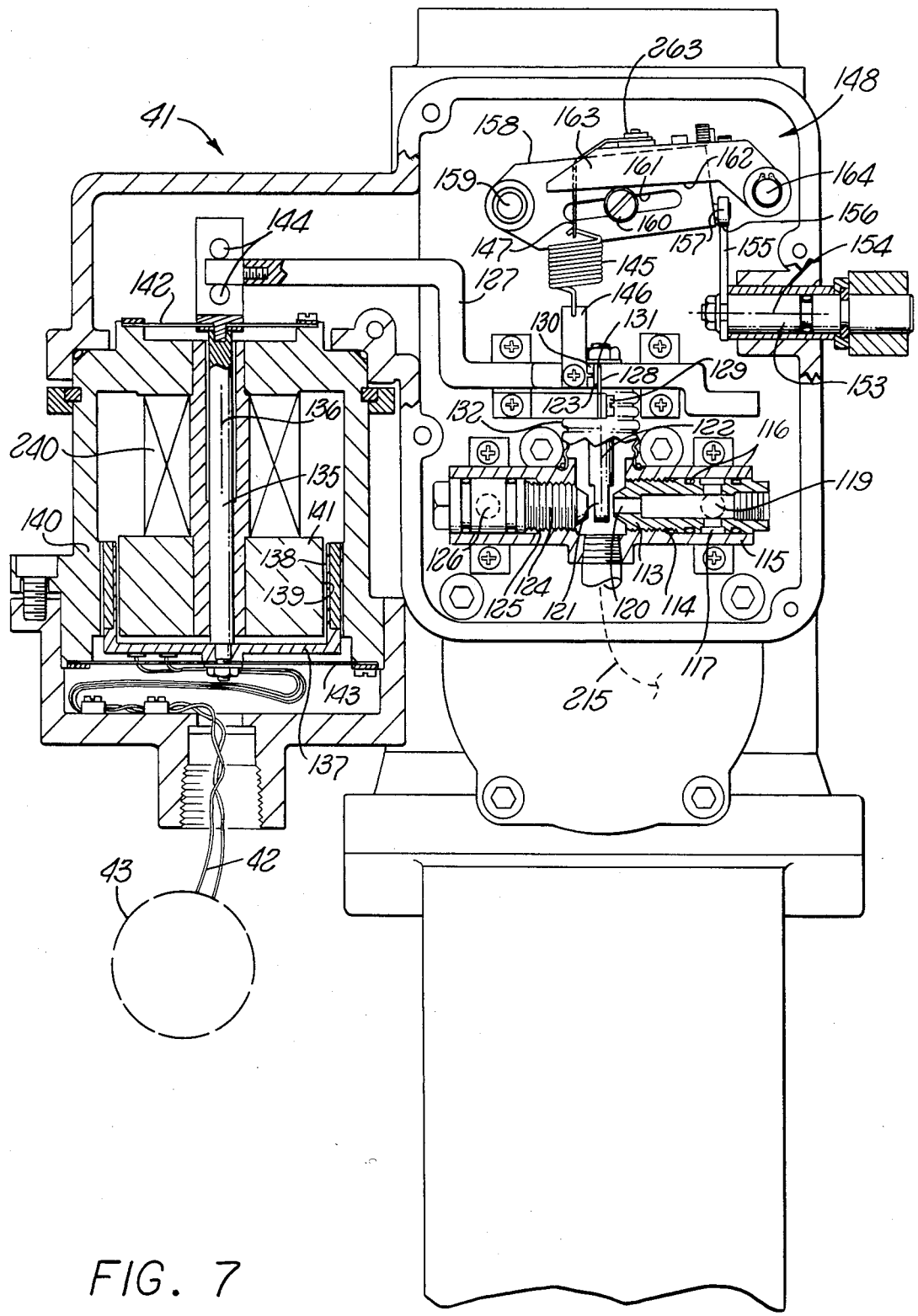
Figure 8:
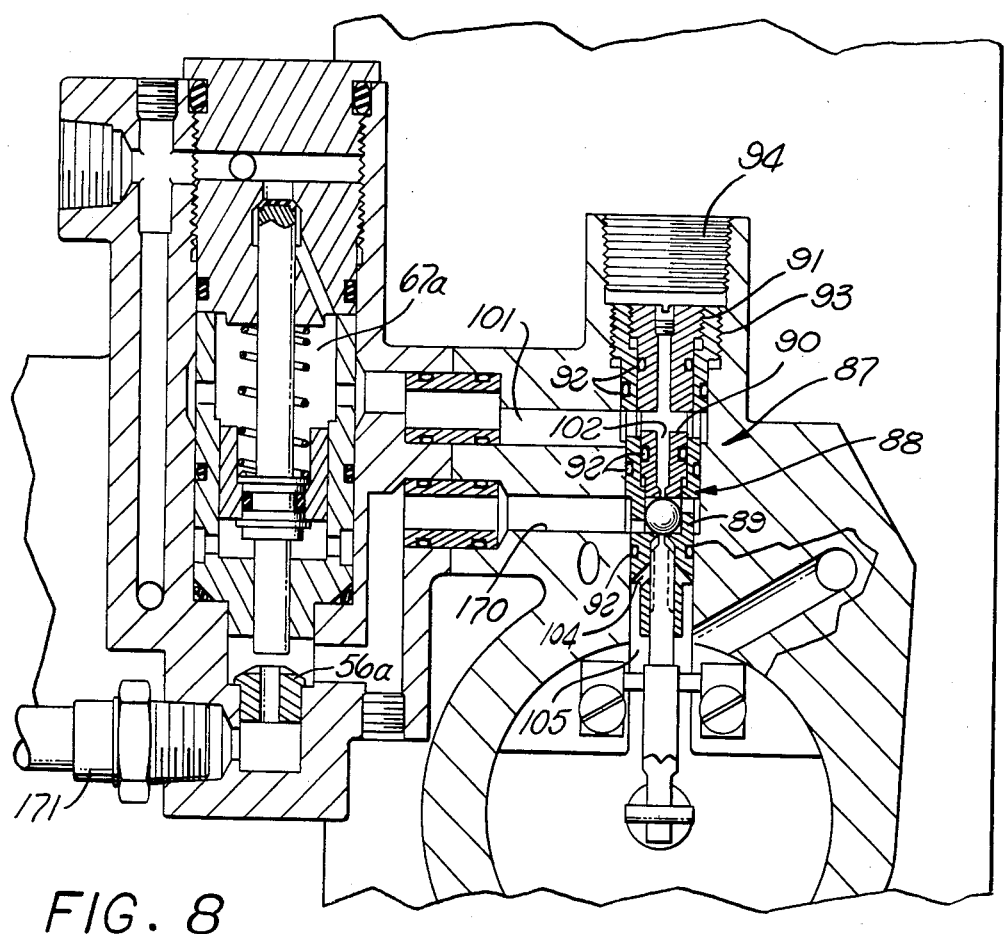
Figure 9:
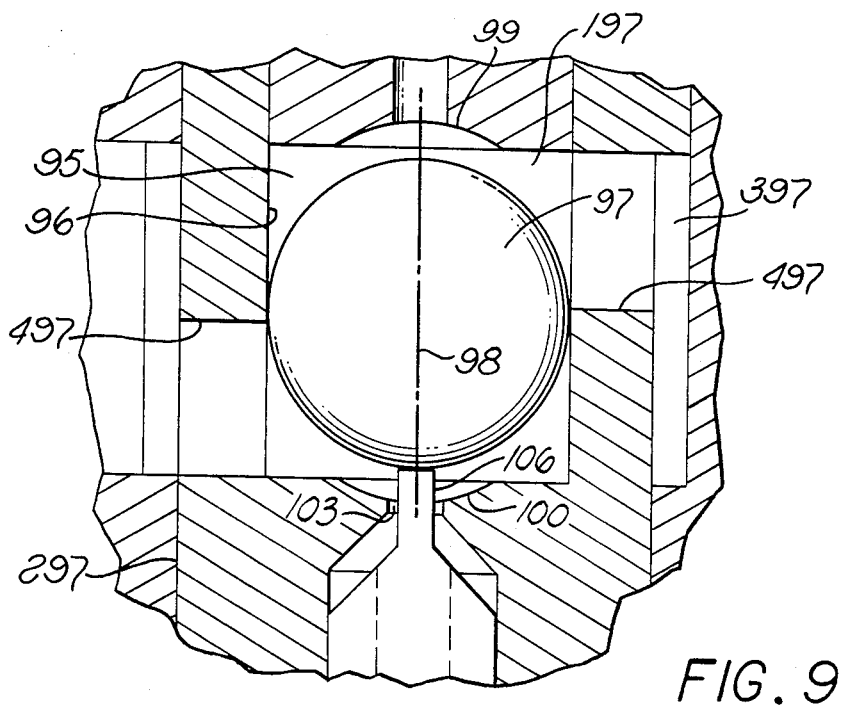
FIG. 9 is an enlarged fragmentary view corresponding to a portion of FIG. 8, and showing the three way hydraulic amplifier valve in enlarged form.

The pressure delivered to the upper cylinder chamber C2 is varied by a three way hydraulic amplifier valve assembly 87 which is mounted within the main body or housing of the device and is illustrated in FIGS. 6, 8 and 9. This three way valve assembly includes a hollow valve body 88 which may be formed sectionally of two parts 89 and 90 secured together by a threaded connection at 91 and sealed with respect to one another and with respect to the main body by a number of O-rings 92. The valve body assembly may be secured in the main body or housing by threads represented at 93, with a plug 94 closing the outer end of the recess or passage 95 within which assembly 87 is received. The two parts 89 and 90 form together an inner chamber 95 having an essentially cylindrical side wall 96 within which a ball valve 97 is confined and guided for limited movement along an axis 98 between extreme positions of engagement with two annular valve seats 99 and 100. As seen in FIG. 8, pressurized fluid from chamber 67a at the reduced pressure determined by restriction element 63 flows through a body passage 101 and registering openings in parts 89 and 90 into a passage 102 formed in valve body part 90 and extending along axis 98 to discharge the pressurized fluid through valve seat 99 into chamber 95. Liquid can leave the opposite side of the chamber 95 by flow past seat 100 into an axial passage 103 and laterally extending passages 104 communicating with a compartment or chamber 105 formed in the body of the device. An actuating pin 106 is guided for axial movement within passage 103 and has an upper reduced dimension end engageable with the ball valve 97 to move it upwardly and downwardly between positions of engagement with the two seats 99 and 100. The pin 106 is of noncircular external configuration at and above the level of laterally extending passages 104 or is otherwise shaped to allow flow of fluid downwardly past the pin and into passage 104.

The diameter of cylindrical wall 96 of chamber 95 may be just slightly greater than the diameter of ball 97, to prevent substantial lateral movement of the ball. The spaces 197 and 297 above and beneath the ball may be placed in communication with one another by provision of an annular passage 397 about part 89 communicating with those spaces through apertures 497. Movement of ball 97 axially to different positions relative to seats 99 and 100 and the openings therethrough varies the pressure within chamber 95 and annular passage 397, and within a communicating passage 170 (FIG. 8) which delivers the pressure thus regulated downwardly through valve seat 56a and through line 171 to upper chamber C2 of the main cylinder.

Pin 106 is actuated by a lever part 107 which is pivoted at 108 to the body of the device, and which is pivotally connected at its opposite end 109 to an actuator 110 connected to the central portion of a diaphragm 111 which is yieldingly urged rightwardly in FIG. 6 by a spring 112 and is urged leftwardly by the pressure of fluid within chamber 105. As will be understood, rightward movement of the flexible diaphragm 111 pivots lever 107 in a counterclockwise direction as viewed in FIG. 6 to move pin 106 and ball valve 97 upwardly toward top seat 99, while leftward movement of the diaphragm permits the pin to move downwardly for engagement of ball 97 with lower seat 100.

The pressure fluid is permitted to escape from chamber 105 only through a discharge nozzle 113 (FIG. 7), which is threadedly connected at 114 into a stationary body 115 and is sealed with respect thereto by O-rings 116 at opposite sides of the annular passage 117 receiving fluid from chamber 105 through passage 119 (FIG. 6). The discharge of fluid from the end 120 of nozzle 113 is regulated by a flapper element 121, which is received opposite the end of nozzle 113 and is carried at the lower end of an arm 122 pivoting essentially about an axis 123 to vary the restriction to fluid discharge offered by flapper 121. A backing element 124 which is constructed essentially the same as nozzle 113 but without a central passage is connected threadedly at 125 into a second end of the structure 115 and acts to limit the pivotal movement of flapper structure 121-122 leftwardly away from the nozzle. It is also noted that the two parts 113 and 124 can be interchanged, with the nozzle 113 being located to the left in FIG. 7 and the part 124 being positioned to the right of flapper 121 at the location at which the nozzle is seen in FIG. 7. In that condition, the annular space 117 in the nozzle then positioned to the left of flapper 121 communicates through an opening 126 (FIG. 7) and a communicating passage 118 (FIG. 6) with the fluid supply passage 119 from chamber 105, so that the flapper then regulates the discharge of fluid rightwardly from the nozzle.

The arm 122 which carries flapper valve element 121 is rigidly connected at its upper end to a balance beam 127, which is mounted by two short flexible straps 128 for limited essentially pivotal movement about the previously mentioned hinge axis 123. The lower ends of the two straps 128 are rigidly secured to the housing structure by screws or other fasteners 129, while the upper ends of the straps are attached by screws 130 to shoulders 131 formed on the balance beam and facing leftwardly in FIG. 7. The fluid discharging from the nozzle may be confined within part 115 and an inverted cup-shaped flexible bellows 132 which is disposed about flapper 121-122 and secured peripherally at its lower end to the part 115 and which is secured at its upper end to balance beam 127 in sealed relation. Flapper arm 122 may be attached at its upper end to beam 127 in any appropriate manner, as by a nut 133 connected threadedly onto the upper end of arm 122 and clamping the balance beam vertically between the nut and a shoulder formed on a part 222 fixed to arm 122. The fluid within part 115 and bellows 132 is returned to the reservoir 24 through appropriate passages in the body or other parts or conduits, with this return line being represented diagrammatically at 215 in FIG. 7. The pressure of the fluid of course drops substantially as the fluid discharges from the nozzle 113 through the gap formed between the nozzle and flapper 121.

The left end of balance beam 127 as viewed in FIG. 7 is urged downwardly by force motor 41 with a force proportional to the DC voltage supplied to that motor. Motor 41 may be of essentially conventional construction, including a shaft 135 extending and movable along a vertical axis 136 and rigidly connected at its lower end to a cup-shaped armature part 137 of magnetic metal having a cylindrical portion 138 received within a gap 139 formed radially between two magnetic metal stator parts 140 and 141. A coil 240 is energized by the signal from input conductors 42 and acts to produce magnetic flux across gap 139 dependent in intensity upon the value of the input signal and causing exertion of a downward force on armature 137 and shaft 135 proportional to that input signal. Two flexible spiders 142 and 143 assist in locating the armature structure centrally within the stator while permitting limited upward and downward movement of the armature. Forces are transmitted from the armature to the balance beam through two contact pins 144 engaging upper and lower sides of the balance beam.

A counteracting feedback force is applied to the balance beam, at a location to the left of its pivotal axis 123 and mounting straps 131, by a coil spring 145 connected to the balance beam by an attaching strap 146 and connected at its upper end to a flexible strap 147 which is pulled upwardly in response to upward movement of the main power piston 32. The means for applying this feedback force to the balance beam includes the external feedback mechanism 39 shown in FIG. 1 and an internal adjusting mechanism 148 (FIG. 7). The mechanism 39 of FIG. 1 includes an essentially vertically extending link 149 which is pivotally connected at its lower end 150 to a lower portion of piston 32 for movement upwardly and downwardly therewith, and which is pivotally connected at its upper end 151 to an arm 152 which turns a shaft 153 about an axis 154. Shaft 153 in turn carries a cam 155 which pivots about axis 154 with shaft 153, and which has an upper edge 156 shaped to extend eccentrically with respect to axis 154 and to thereby advance progressively radially outwardly away from that axis as the edge surface 156 advances leftwardly in FIG. 6. Cam surface 156 engages a follower roller 157 carried by an arm 158 which is mounted for swinging movement about an axis 159, and which carries a screw 160 adjustable along a slot 161 and retainable in any desired position therein by tightening the screw relative to a coacting nut and against part 158. The head of screw 160 in turn egages a bottom edge 162 of a part 163 which is mounted for pivotal movement about an axis 164. The upper end of the previously mentioned strap 147 which is connected to coil spring 145 is connected adjustably to part 163 to vary the effective vertieal length of strap 147. This adjustment is effected by actuation of an adjusting screw 165 (FIG. 6), which is rotatable relative to part 163 but fixed against relative axial movement and which is threadedly connected to an element 263 to which strap 147 is connected to thereby pull the upper end of strap 147 rightwardly as viewed in FIG. 7 in response to rotation of adjusting screw 165. A similar adjusting screw 167 (FIGS. 6 and 7) acts to move pin 160 leftwardly and rightwardly along its mounting slot 161 to vary the point at which that pin engages edge 147 of part 163, and thereby vary the amount of pivotal movement of arm 163 and the amount of upward movement of strap 147 in response to predetermined displacement of the main power piston. Element 167 thus provides a feedback stroke adjustment, while element 165 provides a zero adjustment for the apparatus.

To now describe briefly the operation of the discussed equipment, assume that motor 17 of FIG. 1 is energized and is driving positive displacement pump 22 continuously and at a uniform rate to produce a predetermined constant pressure in the discharge line 44 from the pump. Also assume that a DC input signal is supplied to force motor 41 of FIG. 7 through conductors 42, with its voltage varying in correspondence with the desired powered actuation of valve 16. The pump delivers hydraulic fluid at the pump discharge pressure which may be referred to as the pressure $P_U$, through line 44 to the two valve assemblies 45 and 46 of FIG. 3, maintaining the pressure $P_U$ in chambers 57 and 57a, and maintaining a reduced pressure referred to as $P_D$ in chambers 67 and 67a, with the reduction being determined by the setting of restriction element 63. The differential pressure maintains the two valve elements 53 and 53a open. Pressure $P_D$ is communicated through passage 82 of FIG. 3 to the upper side of valve seat 56 and is communicated through that valve seat and line 84 to chamber C1 in the bottom of the power cylinder. This constant pressure $P_D$ is thus continuously maintained in that chamber C1.

The pressure $P_D$ is also communicated through passage 102 of FIG. 8 to the three way valve chamber 95, with the liquid flowing around ball valve 97 and discharging through passages 103 and 104 into chamber 105 of FIG. 6. The pressure in that chamber acts through diaphragm 111 and lever 107 to actuate pin 106 axially in order to determine the setting of ball valve 97. Flapper 121 in turn controls the pressure within diaphragm chamber 105 by varying the restriction offered to the discharge of fluid from nozzle 113 (FIG. 7), and the position of flapper 121 is controlled by the setting of balance beam 127. The setting of ball valve 97 relative to seats 99 and 100 also regulates the pressure $P_A$ within passage 170 of FIG. 8, and that pressure is communicated through valve seat 56a and line 171 to chamber C2 in the top of the main power cylinder.

For any particular DC voltage which may be delivered to force motor 41 through its input line 42, there is a corresponding position to which piston 32 is actuated automatically in response to that voltage. Whenever the position of the piston is the proper one for the input voltage to which the force motor is then subjected, the upward and downward forces exerted against the piston will be identical and the piston thereof is held positively in fixed position maintaining the controlled valve or other element 16 in a desired setting. In such a condition, ball valve 97 is in an intermediate position between the two seats 99 and 100, with that position being precisely predetermined by the setting of pin 106 to maintain exactly the proper pressure $P_A$ in chamber C2 to balance the greater pressure in chamber C1 applied to a smaller effective piston area. As will be understood, in any such intermediate position, ball 97 forms a first fluid flow gap between the ball and the opening in seat 99 through which the fluid enters valve chamber 95, and a second fluid flow gap between the ball and the opening in seat 100 through which fluid discharges from chamber 95. The ball is automatically actuated by pin 106 to a position in which the relationship between the widths of these gaps and the restrictions formed by the gaps is such as to assure maintenance of the proper pressure $P_A$ in chamber C2. The setting of the ball and flapper 121 also maintains a pressure $P_{HA}$ in the diaphragm chamber 105, which pressure maintains the diaphragm and thereby pin 106 and ball 97 in their proper settings. So long as flapper 121 remains in a certain setting, the ball will remain in its corresponding position and the piston 32 will remain set. If the voltage of the input signal in conductors 42 is then increased, force motor 41 will exert a downward force on the left end of balance beam 127 as viewed in FIG. 7, pivoting the balance beam and connected arm 122 and flapper 121 in a counterclockwise direction, causing the flapper to move closer to the discharge end of nozzle 113 thereby increasing the pressure in chamber 105 and causing leftward movement of diaphragm 111 in FIG. 6. The resultant clockwise pivotal movement of lever 107 allows pin 106 to move downwardly, with corresponding downward movement of ball valve 97, further restricting the flow of fluid from valve chamber 95 through seat 100, and thereby increasing the pressure in line 170 of FIG. 8 leading to top chamber C2. That increased pressure therefore causes downward movement of piston 32 and corresponding actuation of the controlled valve 16. This motion is communicated by feedback mechanism 39-148 to spring 145, to exert an increased upward force through spring 145 on balance beam 127 at a point leftwardly of its hinge axis 123 of a value to exactly counterbalance the increased downward force exerted by the force motor 41 on the balance beam. Since the spring 145 acts against the balance beam at a location near its pivotal axis, while the force motor acts against the beam at a location relatively far from that axis, a light force exerted by the spring can balance a heavier force exerted downwardly by the force motor. The downward actuation of the power piston 32 continues until flapper 125 reaches its initial setting, in which the pressures maintained throughout the system are such as to again balance the upward and downward forces applied to piston 32 and thereby maintain it in a new set position.

The reverse operation of the apparatus will be apparent from the above discussion. If the voltage of the signal applied to force motor 41 is decreased, the reduced downward force applied to the balance beam by that motor will cause clockwise pivotal movement of beam 127 and cause movement of flapper 121 away from nozzle 113, thereby decreasing the pressure in diaphragm chamber 105 of FIG. 6, and causing pin 106 to move ball 97 upwardly toward seat 99 and away from seat 100. This will decrease the pressure applied to top cylinder chamber C2, and cause upward movement of piston 32, with a resultant decrease in the upward force applied by feedback spring 145, to ulimately reach a condition in which the forces applied by that spring and the force motor are balanced and flapper 121 is in its initial setting in which the pressures are all such as to balance the upward and downward forces applied to piston 32 and thus maintain the piston and the controlled valve in a different position corresponding to the electrical input signal.

If ball 97 moves upwardly to a position in which it engages top seat 99 and closes off all flow of fluid through that seat into valve chamber 95, the pressure in passage 170 and in top cylinder chamber C2 falls abruptly to a zero pressure level in which condition the pressure in lower chamber C1 can rapidly move the piston upwardly until the desired null or balanced condition is reached in a new setting of the piston. Similarly, if the ball moves downwardly into engagement with bottom seat 100, a relatively high pressure is applied to top cylinder chamber C2, essentially equalling the pressure in lower chamber C1 but exerting a greatly increased downward force by virtue of the greater area to which the pressure in chamber C2 is applied. Thus the piston can move rapidly downwardly to a new setting at which the null or balanced condition can again be established.

The apparatus as thus far described is direct acting, that is, an increase in the electrical signal to the force motor causes downward extension of the piston rod 11 from the power cylinder. A reverse acting operation can be obtained by reversing the positions of nozzle 113 and backing element 124 of FIG. 7, so that the nozzle is then at the left side of flapper 121, with the result that downward movement of the left end of balance beam 127 will cause a decrease in the pressure of diaphragm chamber 105, resulting in rightward movement of the diaphragm and upward actuation of pin 106 and ball 97, reducing the pressure in upper cylinder chamber C2 and causing upward movement of the piston. The feedback mechanism then automatically decreases the force exerted by spring 145, causing the balance beam to return to its initial position in which the pressures in chambers C1 and C2 are such as to balance the upward and downward forces exerted against piston 32 and maintain the piston in a changed position.

Adjustment of the two adjusting elements 165 and 167 of FIG. 6 enables the stroke of the feedback mechanism and its spring 145 to be adjusted, and enables the zero setting of the apparatus to be set to a desired position.

If the operation of pump 22 is interrupted, either intentionally or unintentionally, the two valve assemblies 45 and 46 of FIG. 3 automatically actuate their valving elements 53 and 53a downwardly against seats 56 and 56a to block off all flow of fluid to or from the cylinder chambers C1 or C2. With a fixed amount of liquid thus confined in both of these chambers, piston 32 is effectively locked in its last position and maintained positively in that position until the pump again is placed in operation.

While a certain specific embodiment of the present invention has been disclosed as typical, the invention is of course not limited to this particular form, but rather is applicable broadly to all such variations as fall within the scope of the appended claims.

We claim:

1. A double acting actuator comprising:
   a fluid actuated unit including a body containing a wall movable in opposite directions by pressure fluid in two chambers at opposite sides of the wall and having a smaller effective area exposed to the fluid in a first of said chambers than to the fluid in the second chamber;
   a source of pressurized fluid connected to said first chamber;
   a three way valve unit including a body structure containing a valve chamber and having an inlet opening introducing pressurized fluid from said source into said valve chamber, an outlet opening conducting pressure fluid from said chamber, and a third opening communicating with said valve chamber at a location essentially between said inlet and outlet openings and leading to said second chamber of said fluid actuated unit;
   said valve unit including a valve element movable in said valve chamber between said inlet opening and said outlet opening and operable by such movement to vary the pressure applied to said second chamber through said third opening;
   a control element downstream of said outlet opening operable to vary the discharge of fluid from said valve chamber through said outlet opening; and
   means responsive to variations in the pressure of fluid between said outlet opening and said control element to actuate said valve element in correspondence therewith.

2. An actuator as recited in claim 1, in which said body of said fluid actuated unit is a cylinder, and said movable wall is a piston reciprocable within said cylinder.

3. An actuator as recited in claim 1, including a nozzle receiving fluid from said outlet opening and discharging it at a predetermined location, said control element being mounted opposite said nozzle in a path of fluid flow therefrom and being movable relative to the nozzle to vary the rate of discharge of fluid from the nozzle.

4. An actuator as recited in claim 1, in which said inlet and outlet openings are essentially aligned with one another at opposite sides of said valve element, and said third opening faces essentially transversely of said inlet and outlet openings at a location therebetween.

5. An actuator as recited in claim 1, in which said means include a diaphragm exposed to the pressure of fluid between said outlet opening and said control element, and means responsive to movement of said diaphragm to actuate said valve element.

6. An actuator as recited in claim 1, in which said means include a structure extending through said outlet opening and engageable with said valve element to actuate it in correspondence with variations in pressure of the fluid between said outlet opening and said control element.

7. An actuator as recited in claim 1, in which said means include a diaphragm responsive to variations in fluid pressure between said outlet opening and said control element, a pivoting lever actuable by said diaphragm, and a part projecting through said outlet opening and acting against said valve element and operable by said lever to move said valve element in correspondence with pressure induced actuation of said diaphragm.

8. An actuator as recited in claim 1, in which said valve unit forms two valve seats disposed about said inlet and outlet openings respectively, said valve element being movable between a first position in which it engages one of the seats and is spaced from the second seat and a second position in which it engages the second seat and is spaced from said one seat.

9. An actuator as recited in claim 1, in which said valve element is a ball received between said inlet and outlet openings.

10. An actuator as recited in claim 1, including valve means automatically responsive to a decrease in fluid pressure from said source to block fluid flow to or from said chambers of said fluid actuated unit.

11. An actuator as recited in claim 1, including shut off valves for blocking fluid flow into or out of said chambers of said fluid actuated unit, and operating pistons for said shut off valves exposed at opposite sides of the pistons to a pressure differential resulting from flow of fluid from said source and acting to maintain said shut off valves open so long as fluid flows from the source but to close said shut off valves in response to a reduction in said pressure differential upon termination of the flow of fluid from said source.

12. An actuator as recited in claim 1, including a power operated unit responsive to variations in an input signal to actuate said control element to vary the discharge of fluid from sais outlet opening.

13. An acturator as recited inclaim 1, includinga force motor rsponsive to variations in an electrical input signal to apply a force ot said control element for varying the discharge of fluid from said outlet opening.

14. An actuator as recited in claim 1, including a power operated device responsive to variations in an input signal to actuate said control element for varying the discharge of fluid from said outlet opening, and feedback means actuable by said movable wall of said fluid actuated unit to apply a counter-acting force to said control element for maintaining said movable wall in a predetermined set position.

15. An actuator as recited in claim 1, including a force motor reponsive to an inputP signal to apply a force to said control element for varying the discharge of fluid from said outlet opening, and a feedback spring connected to said movable wall of said fluid actuated unit and applying a counteracting feedback force to said control element.

16. An actuator as recited in claim 1, including a discharge nozzle receiving fluid from said outlet opening, said control element being a flapper valve opposite said discharge nozzle and movable relative thereto, there being a balance lever connected to saif flapper valve to actuate it, a force motor for applying a force to said balance lever in correspondence with variations in an input signal delivered to the motor, and a feedback spring connected to said movable wall of said fluid actuated unit and applying a counteracting feedback force therefrom to said balance lever.

17. A double acting actuator comprising:

a cylinder;

a piston in the cylinder movable in opposite directions by pressure fluid in two chambers at opposite sides of the piston and having a smaller effective area exposed to the fluid in a first of said chambers than to the fluid in the second chamber;

a source of pressurized fluid connected to said first chamber;

a three way valve unit including a body structure containing a valve chamber having an inlet opening connected to said source of pressurized fluid, an outlet opening, and a third opening intermediate said inlet and outlet openings and leading to said second chamber within said cylinder;

said valve unit including a valve element movable in said valve chamber between said inlet opening and said outlet opening and operable by such movement to vary the pressure applied to said second chamber in the cylinder through said third opening;

a discharge nozzle connected to said outlet opening to receive fluid therefrom;

a fluid compartment between said outlet opening of said three way valve body structure and said discharge nozzle;

a flapper valve received opposite said discharge nozzle and movable toward and away from the discharge nozzle to vary fluid delivery therefrom and thus alter the pressure in said compartment;

an electrically actuated force motor responsive to application of an electrical signal thereto to exert a force tending to move said flapper valve;

a diaphragm exposed to the pressure of the fluid within said compartment;

a part extending through said outlet opening and engageable with said valve element in said three way valve unit body and actuated by said diaphragm to move said valve element in correspondence with variations in pressure in said compartment; and feedback means operable by movement of said piston to exert a feedback force against said flapper valve balancing said force supplied thereto by said force motor when said piston has moved to a predetermined desired setting.

18. An actuator as recited in claim 17, in which said three way valve unit has valve seats disposed about said inlet and outlet openings respectively and engageable by said valve element in different positions thereof.

19. An actuator as recited in claim 18, including a lever within said compartment mounted for pivotal movement by said diaphragm and adapted to actuate said part in correspondence with such pivotal movement to move said valve element of said three way valve unit relative to said two valve seats.

20. An actuator as recited in claim 19, in which said feedback means include a balance lever for actuating said flapper valve and urged in one direction by said force motor, and a spring connected to said piston and exerting force against said balance lever in an opposite direction.

21. An actuator as recited in claim 20, including two shut off valves for closing off fluid flow to and from said two chambers respectively of said cylinder, and actuating pistons connected to said shut off valves and exposed at opposite sides to different pressures produced by flow of fluid from said source and adapted to close said shut off valves automatically when said flow of fluid from the source is interrupted.

22. An actuator comprising:
a fluid actuated unit including a body containing a wall movable by pressure fluid;
a source of pressurized fluid supplying fluid under pressure to a chamber at one side of said wall;
a nozzle adapted to be mounted selectively in first and second positions and operable in each of said positions to discharge a flow of said pressure fluid;
a flapper valve movable toward and away from said nozzle in each of said positions thereof to vary the discharge pressure from the nozzle;
means responsive to said variations in pressure at the nozzle to vary the fluid pressure in said chamber;
two mounting structures to which said nozzle is selectively connectible and which hold the nozzle in said two positions respectively;
a first of said mounting structures being constructed to hold the nozzle in said first position thereof at a location to discharge fluid against said flapper valve at a first side thereof, and the second of said mounting structures being constructed to hold the nozzle in said second position thereof at a location to discharge fluid against the opposite side of said flapper valve, in a relation reversing the direction of movement of said wall for a particular direction of movement of said flapper valve; and
fluid passage means for conducting fluid to said nozzle in each of said first and second positions thereof.

23. An actuator as recited claim 22, including an additional element selectively connectible to said two mounting structures and which in each of said positions of the nozzle is located at the side of the flapper valve opposite that at which the nozzle is located, and which acts to close off discharge of fluid from said passage means at said opposite side.

24. An actuator comprising:
a fluid actuated unit including a body containing a wall movable by pressure fluid;
a source of pressurized fluid supplying fluid under pressure to a chamber at one side of said wall;
nozzle means operable to discharge a flow of said pressure fluid;
a flapper valve movable toward and away from said nozzle means to vary the discharge pressure therefrom; and
means responsive to said variations in pressure at the nozzle means to vary the fluid pressure in said chamber;
said nozzle means being convertible between two different operating conditions and acting in a first of said conditions to discharge fluid against said flapper valve at a first side thereof, and in a second of said conditions to discharge fluid against the opposite side of said flapper valve, in a relation reversing the direction of movement of said wall for a particular direction of movement of said flapper valve.

25. A double acting actuator comprising:
a fluid actuated unit including a body containing a wall movable in opposite directions by pressure fluid in two chambers at opposite sides of the wall and having a smaller effective area exposed to the fluid in a first of said chambers than to the fluid in the second chamber;
a source of pressurized fluid connected to said first chamber;
a three way valve unit including a body structure containing a valve chamber and having an inlet opening introducing pressurized fluid from said source into said valve chamber, an outlet opening conducting pressure fluid from said chamber, and a third opening communicating with said valve chamber at a location essentially between said inlet and outlet openings and leading to said second chamber of said fluid actuated unit;
said valve unit including a valve element movable in said valve chamber between said inlet opening and said outlet opening and operable by such movement to vary the pressure applied to said second chamber through said third opening;
a control element downstream of said outlet opening operable to vary the discharge of fluid from said valve chamber through said outlet opening;
means responsive to variations in the pressure of fluid between said outlet opening and said control element to actuate said valve element in correspondence therewith;
a nozzle receiving fluid from said outlet opening and discharging it toward said control element so that the control element by movement toward and away from said nozzle can vary the flow of fluid through said outlet opening; and
means for mounting said nozzle selectively at either of two opposite sides of said control element to enable operation of the actuator to move said wall in either of two directions in response to the same movement of said control element.

26. An actuator as recited in claim 25, including a back up element for limiting movement of said control element in a direction away from said nozzle and adapted to be mounted selectively at either side of the control element.

27. An actuator as recited in claim 26, in which said mounting means include threaded connections for threadedly mounting said nozzle and said back up element in alignment with one another and at opposite sides of said control element and with the nozzle at either side of the control element.

* * * * *